US009187003B1

(12) United States Patent
Kinser et al.

(10) Patent No.: US 9,187,003 B1
(45) Date of Patent: Nov. 17, 2015

(54) SYSTEMS AND METHODS FOR CHARGING RECEPTACLE LOCK

(71) Applicant: GM GLOBAL TECHNOLOGY OPERATIONS LLC, Detroit, MI (US)

(72) Inventors: Christopher A. Kinser, Grand Blanc, MI (US); Patrick M. Foley, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 14/274,434

(22) Filed: May 9, 2014

(51) Int. Cl.
*B60R 22/00* (2006.01)
*B60L 11/18* (2006.01)
*E05B 47/00* (2006.01)
*E05B 47/06* (2006.01)
*E05B 47/02* (2006.01)

(52) U.S. Cl.
CPC ............ *B60L 11/1818* (2013.01); *E05B 47/00* (2013.01); *E05B 47/026* (2013.01); *E05B 47/06* (2013.01); *B60L 2270/32* (2013.01); *E05B 2047/0048* (2013.01); *Y02T 10/7088* (2013.01)

(58) Field of Classification Search
CPC . Y02T 90/14; Y02T 10/7088; Y02T 10/7005; Y02T 10/7077; B60L 11/1818; B60L 2270/32
USPC ................... 701/22, 49; 320/107, 109; 440/1; 180/65.1, 65.29
See application file for complete search history.

(56) References Cited

U.S. PATENT DOCUMENTS

2010/0098278 A1* 4/2010 Sorensen et al. ............ 381/323
2011/0316479 A1* 12/2011 Baxter et al. ................. 320/109

OTHER PUBLICATIONS

"SAE Electric Vehicle Conductive Charge Coupler", SAE EV Charging Systems Committee, Revised Aug. 2001, SAE J1772.
United Nations Agreement, "Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions", Aug. 12, 2013, Addendum 99; Regulation No. 100, Revision 2.
"Connection Set for Conductive Charging of Electric Vehicles—Part 2: AC Charging Coupler", GB/T 20234.2-2011. Published on Dec. 22, 2011. Effective Mar. 1, 2012.

* cited by examiner

*Primary Examiner* — Gertrude Arthur Jeanglaude
(74) *Attorney, Agent, or Firm* — Ingrassia Fisher & Lorenz, P.C.

(57) ABSTRACT

Methods and apparatus are provided for a charging receptacle lock. The method includes receiving a speed of the vehicle, and receiving sensor data indicating a position of a door covering a receptacle associated with the charging system of the vehicle. The receptacle adapted to receive a connecting device of an external power supply. The method includes outputting one or more control signals to move a lock pin associated with the receptacle between a first, extended position and a second, refracted position based on the speed of the vehicle and the position of the door.

20 Claims, 3 Drawing Sheets

US 9,187,003 B1

SYSTEMS AND METHODS FOR CHARGING RECEPTACLE LOCK

TECHNICAL FIELD

The present disclosure generally relates to vehicles and more particularly relates to systems and methods for a charging receptacle lock of a vehicle.

BACKGROUND

Certain vehicles, such as electric or hybrid electric vehicles, include a charging receptacle that enables the vehicle to be connected to an external power supply. To reduce the chance of hardware damage, generally, the vehicle must be immobilized during the charging process. In certain instances, an electric park brake may be applied to immobilize the vehicle for charging, however, the electric park brake may not be effective to immobilize the vehicle for charging in all situations.

Accordingly, it is desirable to provide improved systems and methods for charging an electric or hybrid electric vehicle, which ensures immobilization in all charging situations. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for controlling a charging system of a vehicle. The method includes receiving a speed of the vehicle, and receiving sensor data indicating a position of a door covering a receptacle associated with the charging system of the vehicle. The receptacle is adapted to receive a connecting device of an external power supply. The method includes outputting one or more control signals to move a lock pin associated with the receptacle between a first, extended position and a second, retracted position based on the speed of the vehicle and the position of the door.

In another embodiment, a charging system for a vehicle is provided. The system includes a receptacle for receiving a connecting device of an external power supply, and a lock pin associated with the receptacle. The lock pin is movable between a first, extended position and a second, retracted position. The system includes a source of range data that indicates a range of a transmission of the vehicle, and a source of speed data that indicates a speed of the vehicle. The system includes a control module that generates one or more control signals to move the lock pin between the first, extended position and the second, retracted position based on the range data and the speed data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
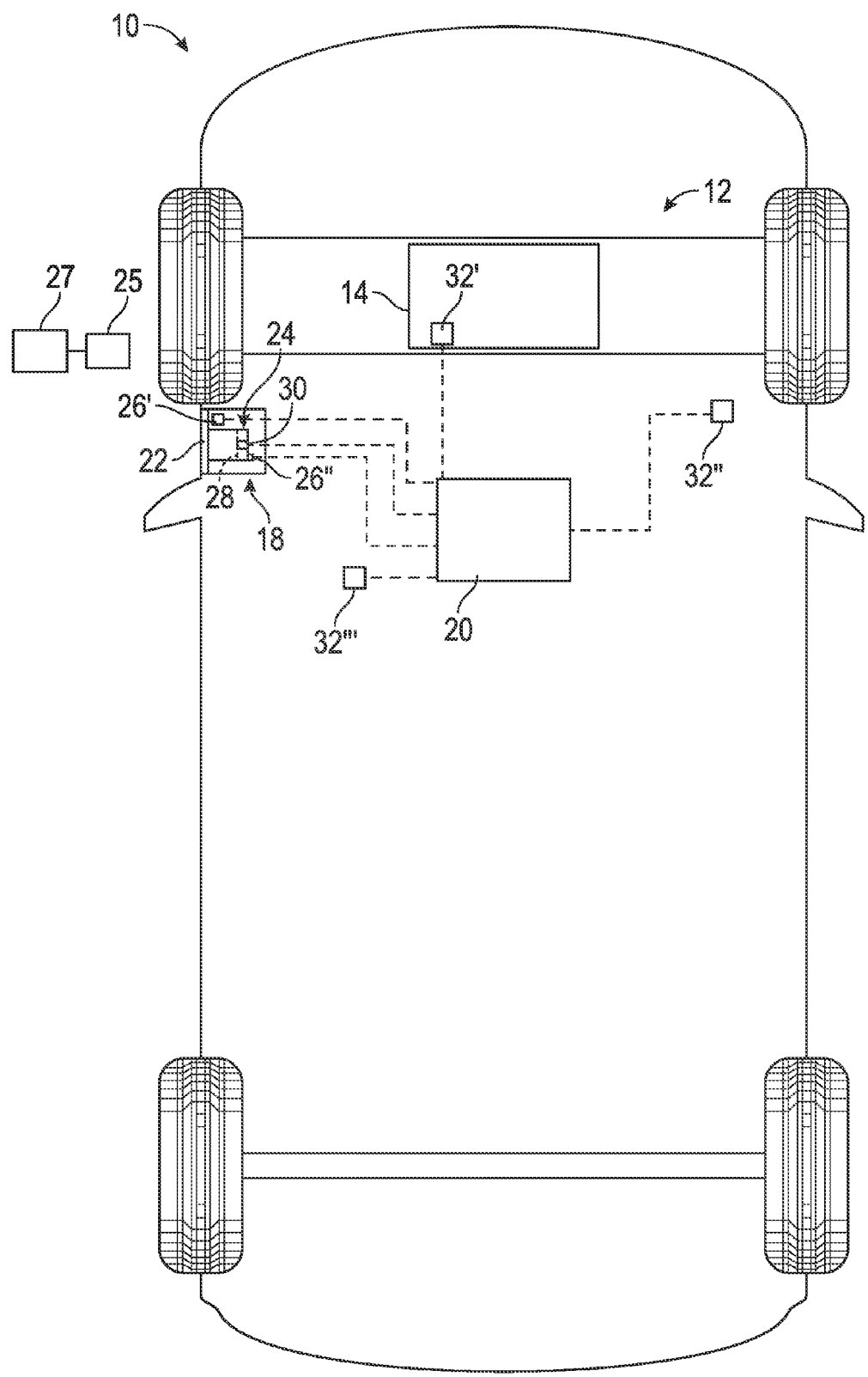
FIG. 1 is a functional block diagram illustrating a vehicle that includes a charging system in accordance with various embodiments.

With reference to FIG. 1, a vehicle 10 includes a powertrain 12 for propulsion. The powertrain 12 includes a propulsion device, which supplies power to a transmission 14. In one example, the propulsion device comprises an electric motor, which may be driven by one or more batteries and/or an internal combustion engine as is known to one skilled in the art. The transmission 14 transfers the power from the powertrain 12 to a suitable driveline coupled to one or more wheels (and tires) of the vehicle 10 to enable the vehicle 10 to move. As known to one skilled in the art, the transmission 14 can comprise a suitable gear transmission, which can be operated in a variety of ranges containing one or more gears, including, but not limited to a park range, a neutral range, a reverse range, a drive range, etc. The vehicle 10 also includes a charging system 16. The charging system 16 enables the charging of one or more batteries associated with the powertrain 12 of the vehicle 10. In one example, the charging system 16 includes a charging port 18 and a control module 20. Although the figures shown herein depict an example with certain arrangements of elements, additional intervening elements, devices, features, or components may be present in an actual embodiment. It should also be understood that FIG. 1 is merely illustrative and may not be drawn to scale.

With continued reference to FIG. 1, the charging port 18 may be positioned at any desired location on the vehicle 10, and thus, the position illustrated is merely exemplary. In one example, the charging port 18 includes a door 22, a receptacle 24 and one or more sensors 26. The door 22 is coupled to a body of the vehicle 10 and is movable relative to the vehicle 10 between an opened position and a closed position to provide access to the receptacle 24. Generally, the door 22 is hinged relative to the body of the vehicle 10 so as to be pivotable relative to the vehicle 10, however, the door 22 can be movable relative to the vehicle 10 via any suitable technique, including, but not limited to, sliding.

The receptacle 24 is shaped and configured to receive a suitable connecting device 25 of an exterior power supply 27. The receptacle 24 includes at least one interface 28 and a lock pin 30. The interface 28 electrically couples the connecting device 25 of the exterior power supply 27 with the one or more batteries of the powertrain 12 to enable the charging of the one or more batteries. The interface 28 can include, but is not limited to, one or more pin connectors.

The lock pin 30 is movable relative to the receptacle 24. In one example, the lock pin 30 is movable between a first, extended position and a second, retracted position based on receipt of one or more control signals from the control module 20. The lock pin 30 may be coupled to a solenoid or other suitable device that receives the control signals from the control module 20 and moves the lock pin 30 between the first and second positions based on the receipt of the control signals as known to one skilled in the art. In the first, extended position, the lock pin 30 obstructs a portion of the receptacle 24 and/or the interface 28 such that the connecting device 25 from the external power supply 27 cannot be coupled to the receptacle 24 and/or interface 28 for charging. Thus, in the first, extended position, the lock pin 30 prevents the vehicle 10 from being coupled to the external power supply. In the second, retracted position, the lock pin 30 is refracted into the receptacle 24 such that the connecting device 25 from the external power supply 27 is couplable or capable of being coupled to the receptacle 24 and interface 28. Thus, in the second, retracted position, the lock pin 30 enables the vehicle 10 to be coupled to the external power supply for charging of the one or more batteries associated with the powertrain 12.

The one or more sensors 26 observe conditions of the charging port 18 and generate sensor signals based on the observed conditions. In one example, the sensors 26 include a door sensor 26' and an interface sensor 26". The door sensor 26' observes a condition of the door 22 and generates sensor signals based on the door 22. For example, the door sensor 26' observes a position of the door 22, such as if the door 22 is ajar, partially opened, completely opened or closed, and generates sensor signals that indicate a position of the door 22. The interface sensor 26" observes a condition of the interface 28 and generates sensor signals based on the interface 28. For example, the interface sensor 26" observes if the connecting device 25 of the external power supply 27 is coupled to the interface 28 and generates sensor signals based on the connecting device 25 being coupled to the interface 28. It should be noted that the sensors 26', 26" are merely exemplary, as any number of sensors 26 could be employed and further, one or more of the conditions measured by the sensors 26', 26" can be derived from other sources, such as by modeling, for example. The signals generated by the sensors 26', 26" are transmitted to the control module 20 through any suitable communication architecture, such as over a bus.

In addition, one or more sensors 32 associated with the vehicle 10 observe conditions of the vehicle 10 and generate sensor signals based on these observed conditions of the vehicle 10, which can be transmitted to the control module 20. In one embodiment, the sensors 32 are onboard the vehicle 10, however, the sensors 32 may be remote from the vehicle 10. In one example, the sensors 32 include a transmission range sensor 32', a speed sensor 32" and an ignition sensor 32'. The transmission range sensor 32' observes a condition of the transmission 14 and generates sensor signals based on the observed condition of the transmission 14. For example, the transmission range sensor 32' observes a range selected for the transmission 14 of the vehicle 10, and generates sensor signals that indicate the selected range. Generally, the transmission range sensor 32' generates sensor signals and/or data that indicate if the selected gear range is PARK, REVERSE, NUETRAL, DRIVE or LOW. The PARK gear range may include a mechanical pawl that prevents movement of the driveline through engagement with a drive unit or axle, as is generally known. It should be noted that the gear ranges provided herein are merely exemplary, as any number of gear ranges may be employed and observed by the transmission range sensor 32'. Further, although the transmission range sensor 32' is illustrated as being associated with the transmission 14, the range selected for the transmission 14 may also be observed from a gear selector or shifter associated with the vehicle 10. Thus, the location of the transmission range sensor 32' is merely exemplary.

The speed sensor 32" observes a speed of the vehicle 10 and generates sensor signals based on the speed of the vehicle 10. In one example, the speed sensor 32" can be a standalone sensor, however, the speed sensor 32" can be associated with a portion of the powertrain 12 and the speed of the vehicle 10 may be calculated based on the observations of the powertrain 12. Furthermore, the speed sensor 32" may be associated with one or more wheels or tires of the vehicle 10. Thus, the speed sensor 32" illustrated herein is merely exemplary.

The ignition sensor 32' observes a condition of an ignition of the vehicle 10 and generates sensor signals based on the observed condition of the ignition. For example, the ignition sensor 32' observes a power state of the ignition of the vehicle 10, and generates sensor signals that indicate the power state of the ignition, such as OFF, ON, STARTING MODE or SERVICE MODE.

Further, it should be noted that the sensors 32', 32", 32' are merely exemplary, as any number of sensors 32 could be employed and further, one or more of the conditions measured by the sensors 32', 32", 32' can be derived from other sources, such as by modeling, for example. The signals generated by the sensors 32', 32", 32' are transmitted to the control module 20 through any suitable communication architecture, such as over a bus.

In various embodiments, the control module 20 controls the lock pin 30 of the charging system 16 based on one or more of the sensor signals, inputs received from other modules associated with the vehicle 10 and methods of the present disclosure. In one example, the control module 20 generates one or more control signals to move the lock pin 30 based on the range of the transmission 14, the speed of the vehicle, the power state of the ignition, the position of the door 22 and the status of the interface 28.

Figure 2:
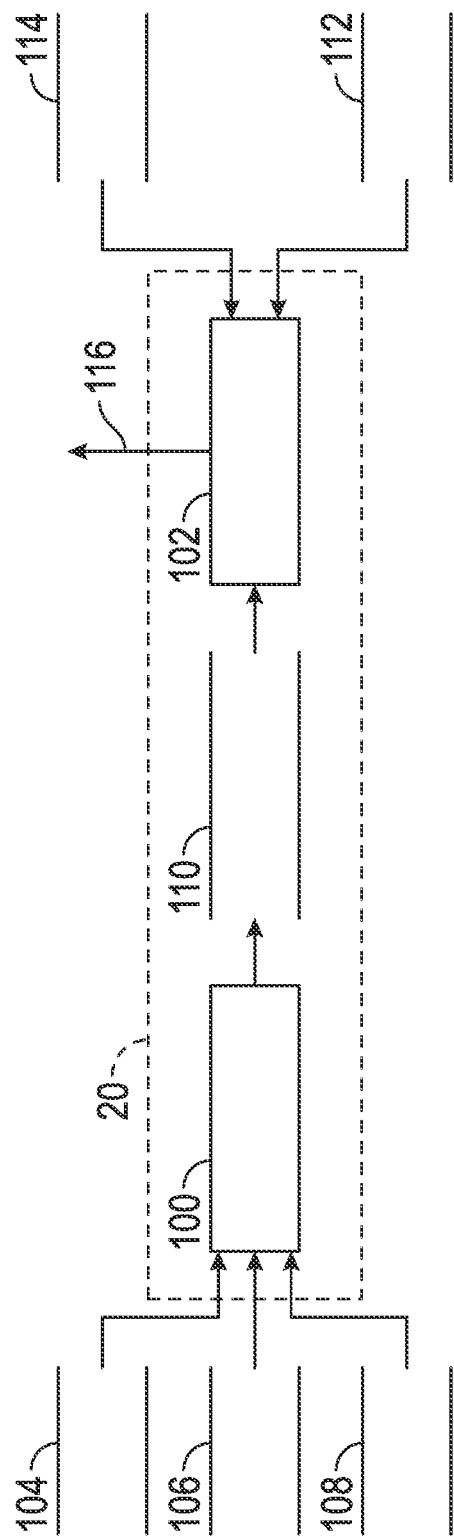
FIG. 2 is a dataflow diagram illustrating a control system of the charging system in accordance with various embodiments.

Referring now to FIG. 2 and with continued reference to FIG. 1, a dataflow diagram illustrates various embodiments of the control module 20 of the charging system 16. Various embodiments of the control module 20 according to the present disclosure can include any number of sub-modules embedded within the control module 20. As can be appreciated, the sub-modules shown in FIG. 2 can be combined and/or further partitioned to similarly generate control signals to the lock pin 30 of the charging port 18. Inputs to the control module 20 may be sensed from the vehicle 10 (FIG. 1), received from other control modules (not shown) within the vehicle 10, and/or determined/modeled by other sub-modules (not shown) within the control module 20. In various embodiments, the control module 20 includes a vehicle control module 100 and a charge control module 102.

The vehicle control module 100 receives as input speed data 104, along with range data 106 and ignition data 108. In one example, the speed data 104 comprises a speed of the vehicle 10 received from the speed sensor 32". The range data 106 comprises a range of the transmission 14 received from the transmission range sensor 32'. The ignition data 108 comprises a power state of the ignition received from the ignition sensor 32'. Based on the speed data 104, range data 106 and ignition data 108, the vehicle control module 100 sets vehicle status data 110 for the charge control module 102. The vehicle status data 110 comprises the speed of the vehicle, the range of the transmission and the power state of the ignition.

The charge control module 102 receives the vehicle status data 110 from the vehicle control module 100, and also receives as input door data 112 and interface data 114. The door data 112 comprises a position of the door 22 of the charging port 18, which is received from the door sensor 26'. The interface data 114 comprises a condition of the interface 28 (i.e. whether the connecting device 25 of the external power supply 27 is connected to the interface 28), which is received from the interface sensor 26". Based on the vehicle status data 110, the door data 112 and the interface data 114, the charge control module 102 outputs one or more control signals 116 for the lock pin 30.

Figure 3:
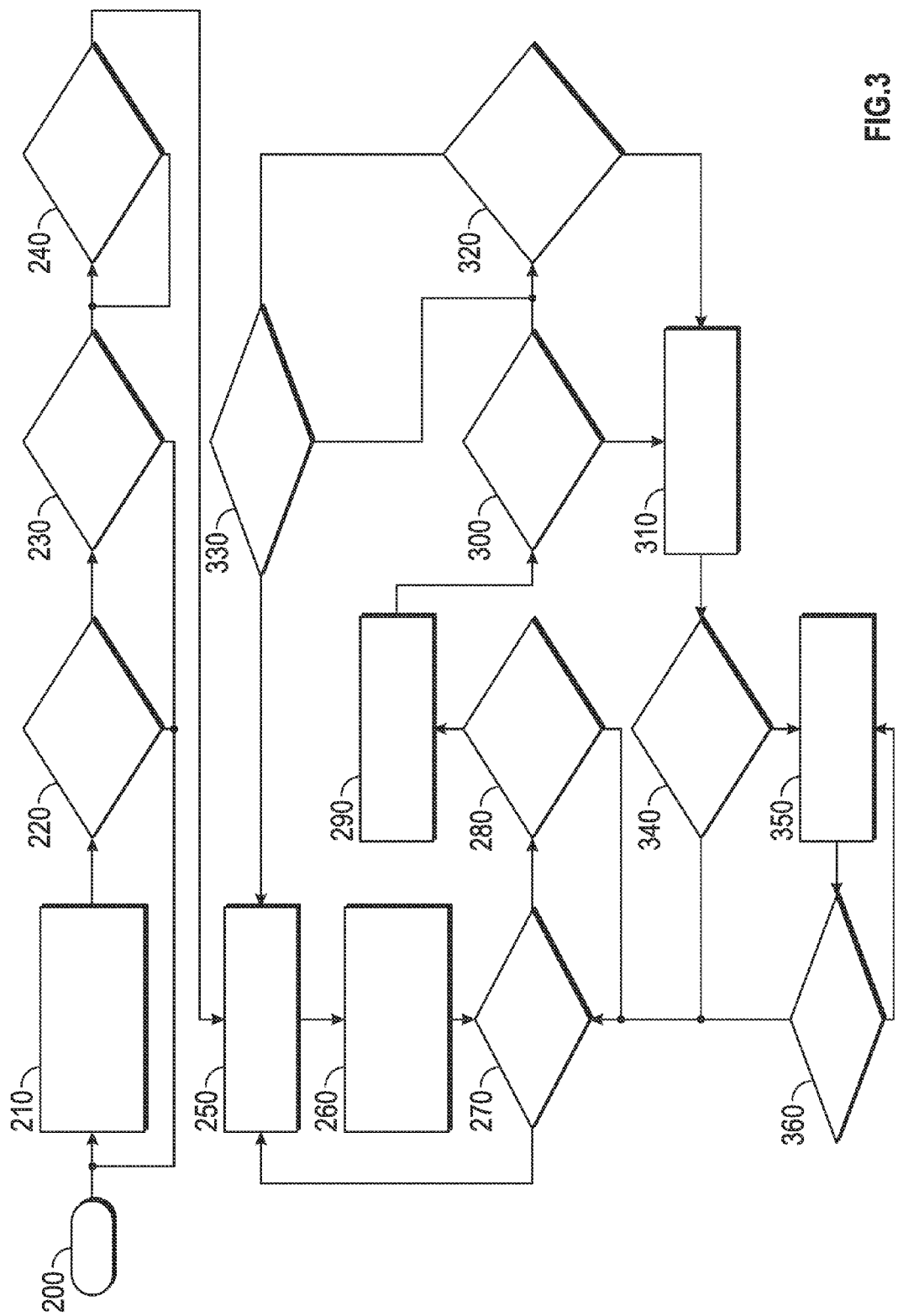
FIG. 3 is a flowchart illustrating a control method of the charging system in accordance with various embodiments.

Referring now to FIG. 3, and with continued reference to FIGS. 1 and 2, a flowchart illustrates a control method that can be performed by the control module 20 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can further be appreciated, one or more steps of the method may be added or removed without altering the spirit of the method.

The method may begin at 200. Generally, the method runs substantially continuously over the life of the vehicle 10, however, the method may run during predefined time periods. In addition, the method may end if an input to the control module 20 is invalid or indeterminate. In this instance, the control module 20 outputs one or more control signals 116 to the lock pin 30 to move the lock pin 30 to the second, retracted position, if necessary, to arrive at a default state for the receptacle 24. In this default state, the connecting device 25 from the external power supply 27 is insertable into the receptacle 24 for charging even if the method of FIG. 3 cannot be executed.

At 210, speed data 104, range data 106 and ignition data 108 are received. At 220, the method determines if the power state of the ignition is ON based on the ignition data 108. If the power state of the ignition is ON, the method goes to 230. Otherwise, the method loops to 210.

At 230, the method determines if the range of the transmission 14 is in the park range based on the range data 106. If the transmission 14 is not in the park range, the method goes to 240. Otherwise, the method loops to 210. At 240, the method determines if the speed of the vehicle 10 is greater than a low value, for example, about three kilometers per hour (kph), based on the speed data 104. If the speed of the vehicle 10 is greater than the low value, for example, about three kph, the method goes to 250. Otherwise, the method loops.

At 250, the one or more control signals 116 are output to move the lock pin 30 into the first, extended state to prevent the connecting device 25 of the external power supply 27 from being coupled to the vehicle 10. At 260, current speed data 104, range data 106 and ignition data 108 are received. At 270, the method determines if the speed of the vehicle 10 is less than a predetermined threshold speed, such as about three kph, based on the speed data 104. If the speed of the vehicle 10 is not less than the predetermined threshold speed, the method loops to 250.

Otherwise, at 280, the method determines if the range of the transmission 14 is in the park range based on the range data 106. If the transmission 14 is not in the park range, the method loops to 270. Otherwise, at 290, the door data 112 and interface data 114 are received. At 300, the method determines if the door 22 of the charging port 18 is opened relative to the body of the vehicle 10 such that access is provided to the receptacle 24 based on the door data 112. If the door 22 is opened, the method proceeds to 310. Otherwise, at 320, the method determines if the power state of the ignition is OFF based on the ignition data 108 and determines a time since the power state of the ignition was turned OFF. If the power state of the ignition is OFF and the time elapsed is greater than a predetermined threshold time, for example, about 60 seconds, the method goes to 310. Otherwise, at 330, the method determines if the speed of the vehicle 10 is greater than the predetermined threshold speed, such as about three kph, based on the speed data 104. If the speed of the vehicle 10 is greater than the predetermined threshold speed, the method proceeds to 250. Otherwise, the method proceeds to 320.

At 310, one or more control signals 116 are output to the lock pin 30 to move the lock pin 30 from the first, extended position to the second, retracted position. The movement of the lock pin 30 from the first, extended position to the second, retracted position enables the connecting device 25 of the external power supply 27 to be received within the receptacle 24 and electrically coupled to the interface 28. At 340, the method determines if the connecting device 25 of the external power supply 27 is coupled to the interface 28 based on the interface data 114. If the connecting device 25 of the external power supply 27 is coupled to the interface 28, the method at 350 enables electrical communication between the interface 28 and the external power supply 27 such that the one or more batteries associated with the powertrain 12 can be charged, as generally known in the art. If the connecting device 25 of the external power supply 27 is not coupled to the interface 28, the method loops to 270.

At 360, the method determines if the connecting device 25 of the external power supply 27 has been removed or decoupled from the interface 28. If true, the method loops to 270. Otherwise, the method loops to 350.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of controlling a charging system of a vehicle, comprising the steps of:
   receiving a speed of the vehicle;
   receiving sensor data indicating a position of a door covering a receptacle associated with the charging system of the vehicle, the receptacle adapted to receive a connecting device of an external power supply; and
   outputting one or more control signals to move a lock pin associated with the receptacle between a first, extended position and a second, retracted position based on the speed of the vehicle and the position of the door.

2. The method of claim 1, wherein the receptacle includes an interface, and in the second, retracted position, the connecting device of the external power supply is couplable to the interface.

3. The method of claim 2, wherein in the first, extended position, the lock pin prevents coupling the connecting device of the external power supply to the interface.

4. The method of claim 1, further comprising:
   receiving a gear range of a transmission associated with the vehicle; and
   outputting the one or more control signals to move the lock pin based on the gear range of the transmission.

5. The method of claim 1, further comprising:
   receiving a power status of an ignition associated with the vehicle; and
   outputting the one or more control signals to move the lock pin based on the power status of the ignition.

6. The method of claim 1, wherein outputting the one or more control signals to move the lock pin between the first, extended position and the second, retracted position further comprises:
   moving the lock pin from the first, extended position to the second, retracted position based on the speed of the vehicle being less than a predetermined threshold speed and the position of the door being open.

7. The method of claim 1, wherein outputting the one or more control signals to move the lock pin between the first, extended position and the second, retracted position further comprises:
   moving the lock pin from the second, retracted position to the first, extended position based on the speed of the vehicle being greater than a predetermined threshold speed and the position of the door being closed.

8. The method of claim 2, further comprising:
   receiving data regarding a condition of the interface; and
   outputting the one or more control signals to move the lock pin based on the condition of the interface.

9. A charging system for a vehicle, comprising:
   a receptacle for receiving a connecting device of an external power supply;
   a lock pin associated with the receptacle and movable between a first, extended position and a second, refracted position;
   a source of range data that indicates a range of a transmission of the vehicle;
   a source of speed data that indicates a speed of the vehicle; and
   a control module that generates one or more control signals to move the lock pin between the first, extended position and the second, retracted position based on the range data and the speed data.

10. The charging system of claim 9, wherein the receptacle includes an interface, and in the second, retracted position, the connecting device of the external power supply is couplable to the interface.

11. The charging system of claim 10, wherein in the first, extended position, the lock pin prevents coupling the connecting device of the external power supply to the interface.

12. The charging system of claim 9, further comprising:
   source of ignition data that indicates a power status of an ignition associated with the vehicle,
   wherein the control module generates the one or more control signals to move the lock pin based on the power status of the ignition.

13. The charging system of claim 9, further comprising:
   source of door data that indicates a position of a door associated with the receptacle,
   wherein the control module generates the one or more control signals to move the lock pin based on the position of the door.

14. The charging system of claim 9, wherein the control module generates the one or more control signals to move the lock pin to the second, refracted position from the first, extended position when the transmission is in a park range and the speed of the vehicle is less than a predetermined threshold speed.

15. The charging system of claim 13, wherein the control module generates the one or more control signals to move the lock pin to the second, retracted position from the first, extended position when the transmission is in a park range, the speed of the vehicle is less than a predetermined threshold speed and the position of the door is open.

16. The charging system of claim 12, wherein the control module generates the one or more control signals to move the lock pin to the second, retracted position from the first, extended position when the transmission is in a park range, the speed of the vehicle is less than a predetermined threshold speed and the power status of the ignition is off.

17. A method of controlling a charging system of a vehicle, comprising the steps of:
   receiving a range of a transmission associated with the vehicle;
   receiving sensor data indicating a position of a door covering a receptacle associated with the charging system of the vehicle, the receptacle including an interface for coupling a connecting device of an external power supply to the vehicle; and
   outputting one or more control signals to move a lock pin associated with the receptacle from a first, extended position to a second, retracted position to enable the coupling of the connecting device to the interface based on the range of the transmission and the position of the door.

18. The method of claim 17, wherein in the first, extended position, the lock pin prevents coupling the connecting device of the external power supply to the interface.

19. The method of claim 17, further comprising:
   receiving a power status of an ignition associated with the vehicle; and
   outputting the one or more control signals to move the lock pin based on the power status of the ignition.

20. The method of claim 17, further comprising:
   receiving a speed of the vehicle; and
   outputting the one or more control signals to move the lock pin based on the speed of the vehicle.

\* \* \* \* \*